United States Patent
Suberviola

(10) Patent No.: US 8,503,511 B2
(45) Date of Patent: Aug. 6, 2013

(54) METHOD AND RECEIVER APPARATUS FOR DETERMINING A CORRELATION VALUE CONSIDERING FREQUENCY CORRECTION

(75) Inventor: Ion Suberviola, Erlangen (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 850 days.

(21) Appl. No.: 12/441,976

(22) PCT Filed: Sep. 29, 2008

(86) PCT No.: PCT/EP2008/008291
§ 371 (c)(1),
(2), (4) Date: Mar. 19, 2009

(87) PCT Pub. No.: WO2009/062569
PCT Pub. Date: May 22, 2009

(65) Prior Publication Data
US 2010/0172448 A1 Jul. 8, 2010

(30) Foreign Application Priority Data
Nov. 13, 2007 (EP) .................................... 07022044

(51) Int. Cl.
*H04B 1/00* (2006.01)
(52) U.S. Cl.
USPC ........... 375/150; 375/147; 375/140; 375/130; 375/316; 375/343

(58) Field of Classification Search
USPC ................. 375/150, 147, 140, 130, 316, 343
See application file for complete search history.

(56) References Cited

U.S. PATENT DOCUMENTS

| | | | |
|---|---|---|---|
| 6,195,328 B1 * | 2/2001 | Tsui et al. | 370/210 |
| 6,952,440 B1 * | 10/2005 | Underbrink | 375/150 |
| 7,848,217 B2 * | 12/2010 | Stahlberg et al. | 370/207 |
| 2003/0108126 A1 * | 6/2003 | Akopian | 375/326 |
| 2004/0179582 A1 * | 9/2004 | Suzuki | 375/145 |
| 2006/0274822 A1 * | 12/2006 | Stahlberg et al. | 375/150 |
| 2007/0025476 A1 | 2/2007 | Rasmussen et al. | |

FOREIGN PATENT DOCUMENTS

WO 2006/119816 A1 11/2006

OTHER PUBLICATIONS

Official Communication issued in International Patent Application No. PCT/EP2008/008291, mailed on Nov. 12, 2008.

* cited by examiner

*Primary Examiner* — Kenneth Lam
(74) *Attorney, Agent, or Firm* — Keating & Bennett, LLP

(57) ABSTRACT

A receiver apparatus for determining a correlation value of a predetermined repetitive chip sequence in a receive signal, the chip sequence having a chip sequence duration and a chip sequence duration cycle. The receiver apparatus has a receive unit for receiving the receive signal and a segmenter for providing receive signal segments from the receive signal, two receive signals representing the same chip sequence in different repetition cycles and having at least one repetition cycle time spacing.

20 Claims, 7 Drawing Sheets

METHOD AND RECEIVER APPARATUS FOR DETERMINING A CORRELATION VALUE CONSIDERING FREQUENCY CORRECTION

BACKGROUND OF THE INVENTION

The present invention is in the field of frequency correction of receive signals, as e.g. occurring as Doppler shifts in spread spectrum received signals when there is a motion between a transmitter and a receiver.

In wireless communications it is a known problem that frequency shifts occur, if receiver and transmitter are not stationary. The so-called Doppler shifts are a general problem of mobile communications, as receivers of frequency shifted signals often need to apply frequency corrections in order to achieve sufficient signal quality. This problem has a general character and occurs in basically most of mobile communication systems. In the following, reference will be made to spread spectrum communication systems, however, similar considerations can be taken with respect to other mobile communication systems as well.

In spread spectrum communication systems, predefined sequences, so-called chip sequences, are utilized in order to spread an information signal in the frequency domain. At a receiver, a replica of said chip sequence is generated, in order to correlate the generated sequence with the receive or received signal. In the following the expressions of receive and received signal will be used synonymously. Through correlation, the desired signal can be extracted from the receive signal, this operation is also referred to as despreading. The utilized chip sequences are also known as PRN codes (PRN=Pseudo Random Noise). The correlation at the receiver can wipe out the PRN code and is basically done by correlation, i.e. by multiplying and integrating the incoming signal with the code replica.

In order to enable proper correlation, the beginnings of both codes, i.e. the replica and the code within the received signal, should be aligned in time, which can be done by an iterative search through correlations with received signals of different time shifts. So in a first dimension a proper time shift can be evaluated.

Another dimension of search can be frequency, where signal errors or distortions are due to the so-called Doppler effects. Due to the mutual motion of the transmitter and receiver, the received signal can be shifted in frequency. Therefore, the second search dimension may be in frequency. Both effects, frequency and time shifts, are unknown at the receiver, and different algorithms can be used to decrease them.

Finding the delay of the incoming code, also referred to as the code delay, is the aim of for example GNSS (GNSS=Global Navigation Satellite Systems). A correlation in the frequency domain, for example utilizing the FFT (FFT=Fast Fourier Transform), can be used to determine this value. As mentioned above, care also needs be taken on the Doppler effect, as the frequency shift should be deleted or decreased as well. In order to do so, one known algorithm is to perform an iterative search through a grid of possible Doppler frequencies, which is determined by the Doppler frequency range, which can for example be [−5, 5] kHz in a GNSS with static receivers.

Moreover, there are known algorithms for increasing a signal-to-noise-ratio (SNR) of a correlation value at the receiver. In the following correlation of receive signal segments with chip sequences will be illuminated.

Here and for the remainder a correlation value shall correspond to a result of correlating two sequences, which yields a correlation function or sequence composed of multiple correlation values. However, within these resulting sequences there may be particular correlation values, e.g. a peak value or a value fulfilling a predetermined condition which is to be detected for example to find a correct delay of a received sequence. Therefore the expression of correlation value may correspond to a value of a correlation result in terms of a sequence or function.

An actual public algorithm for increasing the SNR is for example the so-called alternate half-bit method (AHBM) and the so-called full-bit method (FBM). They defer with respect to the coherent integration time, which is used at a correlator for integration, and which is half of a bit (AHBM) or a full-bit (FBM) duration respectively. Integration times which exceed those durations, refer to incoherent integrations, because outside these durations the modulating data is unknown, therefore coherent superposition of these signal parts may not be anticipated. However, it is also known that the gain of incoherent integration is not as high as the gain of coherent integration, especially in low SNR scenarios. For example in indoor scenarios, where rather weak receive signals can be received, with a short coherent integration time proper detection may not be possible. A problem of these conventional systems is that a proper positioning within indoor scenarios or low SNR scenarios is difficult.

Furthermore, the amount of coherently integrated signal duration limits the grid side of a Doppler frequency grid to be searched. The maximum frequency jump, which can be done, is given by the expression $$\Delta f_{bin} = \frac{2}{3 \cdot T_{COH}}. \tag{1}$$

This condition takes into account, that phase variations within a coherently integrated signal fraction (of duration $T_{COH}$) should be limited in order to prevent destructive superposition. If one demands that at least half of the signal power can be integrated within the coherent time, it yields that the maximum allowable phase shift is two-thirds of $\pi$, implying the above condition for the maximum frequency jump.

For example, in indoor scenarios, it is already known that the SNR is very low. Therefore, it seems to be appropriate to increase the coherent integration time in order to acquire s satellite's signal properly and for afterwards obtaining the users position more properly as well. However, according to the above condition, the higher the coherent integration time the finer the Doppler frequency grid, and consequently, the higher the complexity since a finer Doppler grid provides a lot more Doppler frequencies to be considered. Moreover, when extending coherent integration times to a higher value than a single bit duration, this implies that the data symbols or bits within the coherent integration time should be known to be able to combine them coherently. Otherwise if the bits are unknown and integrating across bit boundaries of different bits, bit sign changes can cause destructive superposition. This again would imply that a pilot channel has to be available in the communication system, i.e. a known transmit data sequence. If the transmitted bit sequence is not known, and noting that one bit translates at least one chip sequence or a number of chip sequences which could be combined coherently, the receiver does not know whether a sign change has occurred or not at the bit boundaries. Therefore, coherent combining across bit borders is very critical if the bits are unknown.

As already mentioned above, increasing the coherent integration time generates a proportional increment of the number of correlations to be performed, assuming that at least one correlation needs to be performed per Doppler frequency shift conceivable. Moreover, even if a system has a pilot channel the pilot channel consisting of a repeating data sequence would then imply that a synchronization process has to be carried out, which can dramatically enlarge the complexity of a detection algorithm in terms of the amount of operations that need to be carried out.

The abovementioned AHBM and FBM algorithms have only a limited coherent integration time, due to the bit boundaries and therefore their performance is very limited with respect to low SNR scenarios. For longer coherent integration times a pilot channel is necessitated, but even if there is a pilot channel, the number of operations that have to be performed with the pilot channel may take a lot of processing time at the receiver. If such synchronization is necessitated a receiver structure may become more complex, its power consumption may rise and the complexity of the detection algorithm may increase significantly.

WO 006/119816a1 describes a concept for decoding a signal based on an incoming stream of data samples representing at least one downconverted digitized spread spectrum source signal. The received data samples are subdivided into a number of data blocks, which are individually correlated with a locally available code replica, before being processed for Doppler frequency compensation.

US 2007/0025476 A1 discloses methods and apparatus for determining carrier frequency errors of a serial offset quadrature pulse shaped signal, such as a minimum shift keyed signal. The carrier frequency error is determined by receiving a quadrature pulse shaped signal having a synchronization sequence detecting synchronization of the quadrature pulse shaped signal and storing a baseband inphase signal and a baseband quadrature signal of the synchronization sequence while detecting synchronization. After detecting synchronization segments of the stored baseband inphase and quadrature signals are read and correlated with the spreading sequence. Carrier frequency error is then estimated based on phase differences between each of the correlated signals.

U.S. Pat. No. 6,195,328 B1 provides an improved acquisition and tracking system for GPS signals. The system relies on block adjustment of the synchronizing signal of the biphase shift keying signal in order to obtain correct carrier frequency and phase angle. This improved system has the advantages of being more robust in the presence of noise than conventional approaches and also of lending itself to simplified implementation since synchronization of the coarse/acquisition code need only be within half of a chip in order to maintain lock.

SUMMARY

According to an embodiment, a receiver apparatus for determining a correlation value of a predetermined repetitive chip sequence in a receive signal, the chip sequence having a chip sequence duration and a chip sequence repetition cycle may have a receive unit for receiving the receive signal; a segmenter for providing receive signal segments from the receive signal, two receive signal segments representing the same chip sequence in different repetition cycles and having at least one repetition cycle time spacing; a frequency corrector for determining sets of frequency corrected receive signal segments based on sets of correction frequencies, the correction frequencies being based on the chip sequence duration and the chip sequence repetition cycle; a chip sequence generator for generating the predetermined chip sequence; a correlator for correlating the predetermined chip sequence with the frequency corrected receive signal segments of a set to acquire a set correlation value; and a selector for selecting one of the set correlation values meeting a predetermined condition as the correlation value.

According to another embodiment, a method for determining a correlation value of a predetermined repetitive chip sequence in a receive signal, the chip sequence having a chip sequence duration and a chip sequence repetition cycle may have the steps of receiving the receive signal; providing receive signal segments from the receive signal, two receive signals segments representing the same chip sequence in different repetition cycles and having at least one repetition cycle time spacing; determining sets of frequency corrected receive signal segments based on sets of correction frequencies, the correction frequencies being based on the chip sequence duration and the chip sequence repetition cycle; generating the predetermined chip sequence; correlating the predetermined chip sequence with the frequency corrected receive signal segments of a set to acquire a set correlation value; and selecting one of the set correlation values meeting a predetermined condition as the correlation value.

According to another embodiment, a computer program may have a program code for performing, when the program code runs on a computer, a method for determining a correlation value of a predetermined repetitive chip sequence in a receive signal, the chip sequence having a chip sequence duration and a chip sequence repetition cycle having the steps of receiving the receive signal; providing receive signal segments from the receive signal, two receive signals segments representing the same chip sequence in different repetition cycles and having at least one repetition cycle time spacing; determining sets of frequency corrected receive signal segments based on sets of correction frequencies, the correction frequencies being based on the chip sequence duration and the chip sequence repetition cycle; generating the predetermined chip sequence; correlating the predetermined chip sequence with the frequency corrected receive signal segments of a set to acquire a set correlation value; and selecting one of the set correlation values meeting a predetermined condition as the correlation value.

The present invention is based on the finding that a more efficient correlation value or function can be retrieved, respectively a higher SNR with a similar computational burden, if shorter repetitive sequences of the receive signals are used for coherent combining, where the time spacing between the repetitive sequences is larger than the sequence duration itself. In embodiments these repetitive sequences may correspond to a pilot channel having repetitive symbols, where a symbol may be represented by a chip sequence such as for example a pseudo random noise sequence (PRN). This way, the number of frequency offsets to be taken into account in order to compensate for the Doppler shifts can be lowered, reducing the computational complexity. Moreover, the number of correlations to be performed within an iterative search among all possible Doppler offsets or frequencies can be further reduced, if a repetition cycle of the sequence, i.e. the time spacing between the repetitive segments as e.g. a repetition period of a pilot symbol, and the sequence duration are chosen in a manner that groups of possible Doppler frequencies occur, wherein within a group of possible Doppler frequencies correlations can be approximated by phase shifts of the correlation value of, for example, a center frequency of the group. Looking at the scheme in another way, a better SNR can be achieved at the same computational complexity than with conventional approaches. Moreover, correlation values can be further improved if Doppler frequency changes are taken into account as well. Especially if the repetition cycle, respectively the number of sequences taken into account being separated by a repetition cycle, is long, the Doppler frequency, i.e. frequency offsets, may change during the acquisition of the repetitive sequences. SNRs of correlation values or functions can be further improved when taking the Doppler frequency changes into account.

In some embodiments, e.g. for GNSS, the Doppler frequency change rate can be taken into account. Because this effect can produce changes on the phases e.g. of the correlation peaks of each segment. This consideration may produce a third-search-dimension, i.e. a frequency change rate search. In embodiments a frequency change rate may also be approximated by phase shifts and the computational complexity may be further reduced.

BRIEF DESCRIPTION OF THE DRAWINGS

In the following, embodiments of the present invention will be described using the accompanying figures, in which.

DETAILED DESCRIPTION OF THE INVENTION

Figure 1:
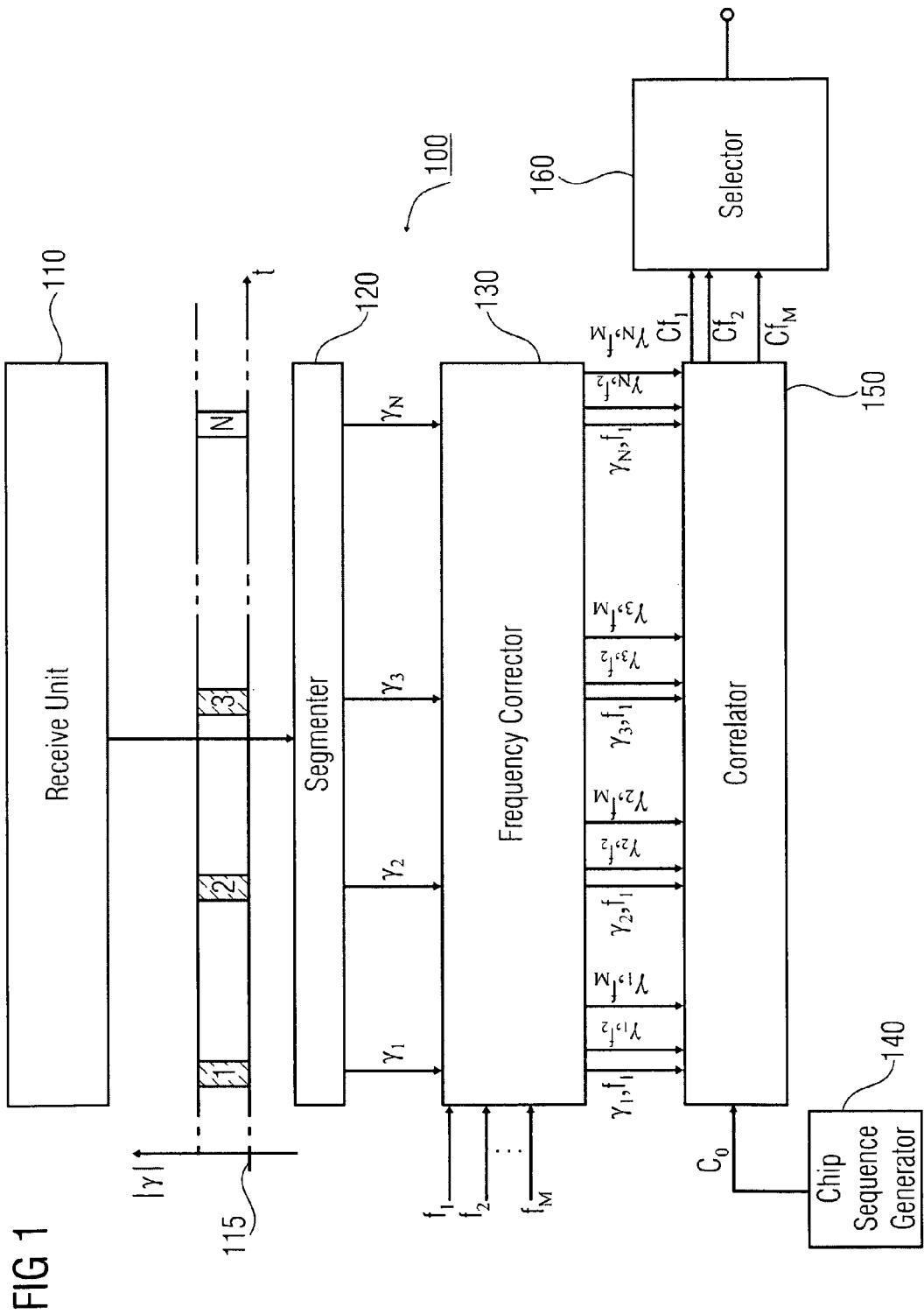
FIG. 1 shows a block diagram of an embodiment of a receiver apparatus.

FIG. 1 shows a block diagram of a receiver apparatus 100. The receiver apparatus comprises a receive unit 110, a segmenter 120, and frequency corrector 130, a chip sequence generator 140, a correlator 150, and a selector 160.

Here and for the remainder a correlation value shall correspond to a result of correlating two sequences, which yields a correlation function or sequence composed of multiple correlation values. However, within these resulting functions or sequences there may be particular correlation values, e.g. a peak value or a value fulfilling a predetermined condition, which is to be detected for example to find a correct delay of a received sequence. Therefore the expression of correlation value may correspond to a value of a correlation result in terms of a sequence or function.

The receiver apparatus 100 is adapted for determining a correlation value or function of a predetermined repetitive chip sequence in a receive signal 115, which is illustrated between the receive unit 110 and a segmenter 120 in FIG. 1. The receive signal 115 is shown along a time axis, on which chip sequences 1, 2, 3, . . . , N are pointed out. The chip sequences have a chip sequence duration and a chip sequence repetition cycle, e.g. like a pilot data sequence. In other words, from the receive signal 115 in FIG. 1, it can be seen that a chip sequence has a duration and that a chip sequence repeats after a certain repetition cycle, e.g. in a repetitive pilot symbol frame, wherein a pilot symbol is represented by, respectively modulating, one or multiple, possibly also repetitive, PRN sequences, i.e. the segments in the receive signal 115 which are also labeled with 1, 2, 3, . . . , N are the same repetitive chip sequences.

The receiver apparatus 100 comprises the receive unit 110 for receiving the receive signal 115. The segmenter 120 is adapted for providing receive signal segments from the receive signal, two receive signal segments representing the same chip sequence in different repetition cycles and having at least one repetition cycle time spacing. In embodiments the receive signal segments can correspond to PRN sequences, which are modulated by repetitive pilot symbols. These segments are then provided to the frequency corrector 130, which is adapted for determining sets of frequency corrected receive signal segments based on sets of correction frequencies, the correction frequencies being based on the chip sequence duration and the chip sequence repetition cycle.

The chip sequence generator 140 is adapted for generating the predetermined chip sequence within the receiver apparatus 100. The predetermined chip sequence corresponds to a local replica of the repetitive chip sequence in the receive signal. The correlator 150 is adapted for correlating the predetermined chip sequence with the frequency corrected receive signal segments of a set to obtain a set correlation value or function; and the selector 160 is adapted for selecting one of the set correlation values or functions meeting a predetermined condition as the correlation value or function.

Figure 2:
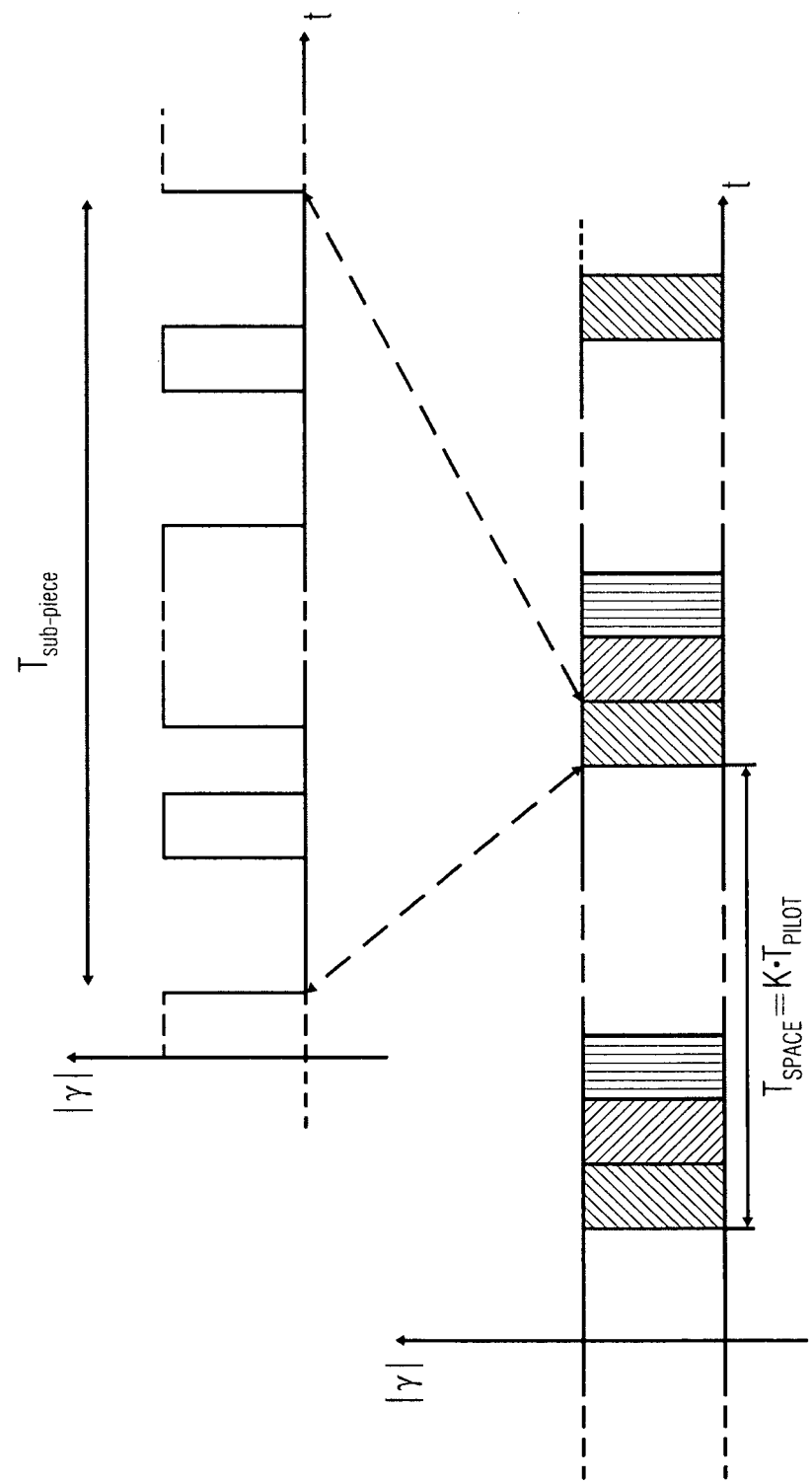
FIG. 2 illustrates a received signal comprising a repetitive chip sequence.

In order to better illustrate the components of the receive signal 115, FIG. 2 shows another embodiment of a receive signal comprising a repetitive chip sequence.

FIG. 2 shows two time lines, one at the bottom and one at the top, on which a receive signal is indicated. The receive signal's magnitude is indicated by |r|. From the bottom diagram it can be seen that a receive signal has repetitive segments, which have a repetition cycle or time spacing $T_{SPACE}=KT_{PILOT}$, where K is a positive integer value and wherein repetitive segments are indicated by repetitive patterns. At the top of FIG. 2, a magnified version of a segment is shown, where the duration of one segment is $T_{sub-piece}$. From the top diagram of FIG. 2, it can be seen that one segment is composed of a chip sequence, which in embodiments may be composed of several chip sequences as well.

Referring back to FIG. 1, it is the task of the segmenter 120 to provide receive signal segments from the receive signal, wherein two receive signal segments represent the same sequence in a different repetition cycle, having at least one repetition cycle time spacing. In embodiments the receive signal segments can correspond to PRN sequences, which are modulated by repetitive pilot symbols. Moreover in embodiments more than two receive signal segments may be considered, which all represent the same sequence in a different repetition cycle or pilot period, having at least one repetition cycle or period duration time spacing. In other words, at the receiver apparatus 100, an attempt to find the time stamps of a certain sequence within the receive signal is made by correlating the receive signal segments, wherein the said chip sequence is present, and by adding up said correlations in order to improve an SNR, e.g. in order to distinguish a peak value within said correlations.

FIG. 1 shows that the segmenter 120 provides the receive signal segments $r_1, r_2, \ldots, r_N$ to the frequency corrector 130. It is pointed out that it is an example to use N segments. Embodiments are not restricted to any number of segments.

The frequency corrector 130 now corrects the frequency of the receive signal segments, by applying different sets of correction frequencies to the set of segments. In other words, a set of correction frequencies comprises one correction frequency per receive signal segment. Said one correction frequency is then applied to the corresponding segment of the receive signal segments, yielding a set of frequency corrected receive signal segments. The frequency corrected receive signal segments of the set of frequency corrected receive signal segments are then individually correlated with the predetermined chip sequence and the results are summed up, yielding a set correlation value. It is to be noted that correlation value corresponds to one value of a correlation sequence or function, i.e. correlation sequences or function may be summed up.

The set of correction frequencies comprises correction frequencies, which are based on the chip sequence duration and the chip sequence repetition cycle. In other embodiments, the correction frequencies might also have to take into account the receive signal's frequency changes. In the embodiment described in FIG. 1, each frequency correction set comprises one correction frequency for each receive signal segment. The frequency corrector 130 can be adapted for determining one set of correction frequencies per frequency of a coarse grid of frequencies between a minimum coarse frequency and a maximum coarse frequency, with a coarse step size depending on the chip sequence duration. The number of different sets of correction frequencies then corresponds to the number of different correction frequencies of the coarse grid, each frequency correction set comprises one correction frequency for each receive signal segment.

Figure 3:
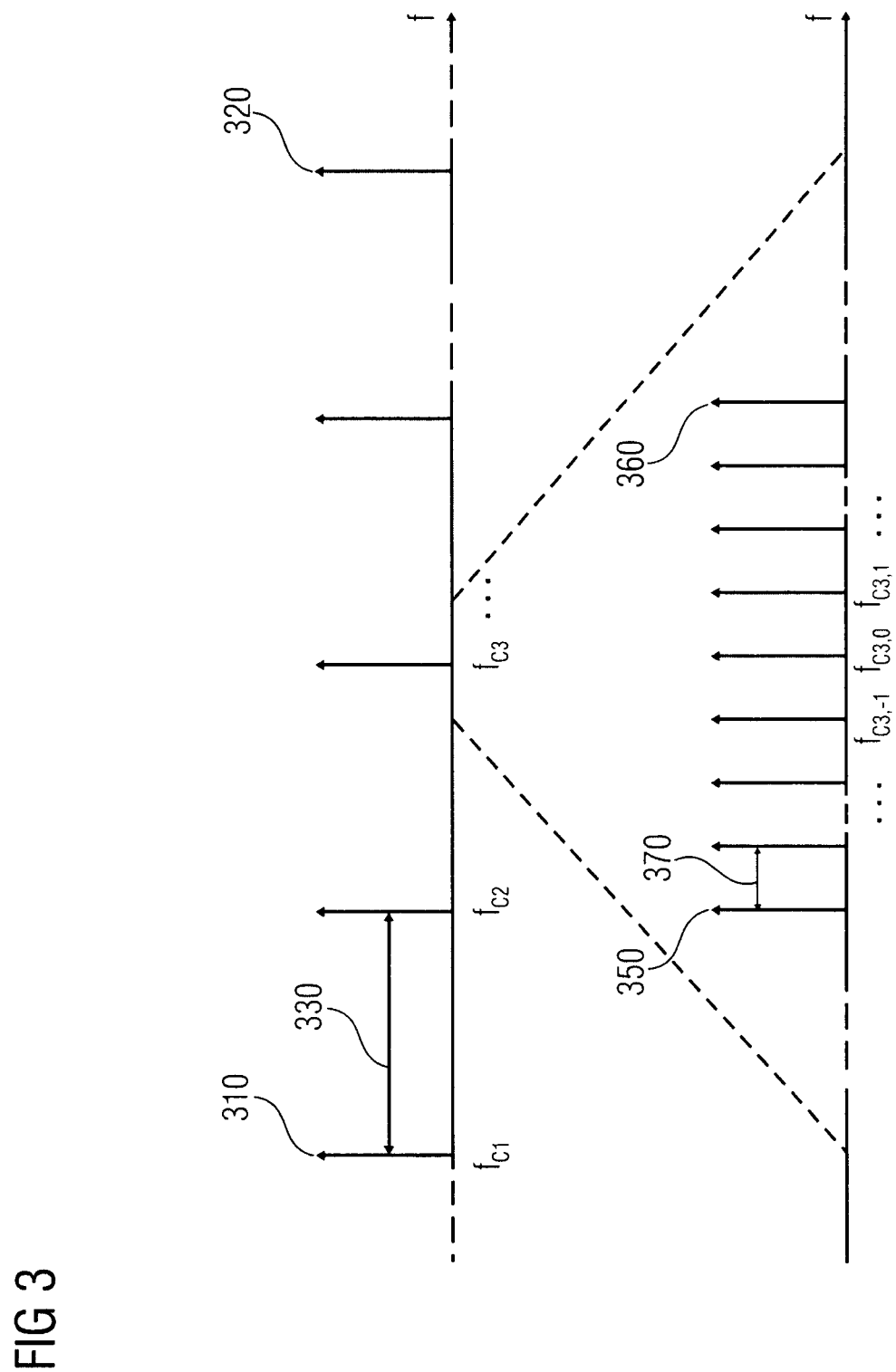
FIG. 3 illustrates a coarse and a fine grid of correction frequencies.

FIG. 3 illustrates a coarse and a fine grid of correction frequencies. At the top of FIG. 3, a frequency line with a coarse grid of frequencies $f_{C_i}$ is illustrated, where i is an index for the coarse correction frequencies, which can be of any value in embodiments. The coarse grid of frequencies may start at the minimum coarse frequency $f_{C_1}$ 310 and reach to a maximum coarse frequency 320. Within the grid, the coarse frequencies may be equidistant, e.g. as indicated by the coarse frequency step size 330, which can depend of the chip sequence duration. In one embodiment, the minimum coarse frequency 310 would be greater than or equal to −5 kHz, the maximum coarse frequency 320 could be less than or equal to 5 kHz, and the coarse step size 330 could be less than or equal to two-thirds divided by the chip sequence duration, in order to ensure coherency between the correlation values of each frequency corrected segment of one set.

Moreover, the frequency corrector 130 may be adapted for determining one set of correction frequencies $f_{C_{i,j}}$ per frequency of a fine grid of correction frequencies around a correction frequency $f_{C_i}$ of the coarse grid, where j is an index for the fine correction frequencies, which can be of any value in embodiments. This is indicated in the lower part of FIG. 3, where an area around a coarse correction frequency $f_{C_3}$ is magnified. The diagram at the bottom on FIG. 3 shows a frequency axis, with a fine grid of correction frequencies $f_{C_3,-1}$, $f_{C_3,0}$, $f_{C_3,1}$, exemplified around one correction frequency $f_{C_3}$ of the coarse grid. Similar to what was said above, the fine grid can comprise a minimum fine frequency offset 350 and a maximum fine frequency offset 360, where offset refers to a respective center frequency, which may be a frequency from the coarse frequency grid. Moreover, a fine step size 370 may be applied for equidistant fine grid correction frequencies.

In one embodiment, the minimum fine frequency offset 350 may be greater than or equal to −0.5 divided by the chip sequence repetition cycle, the maximum fine frequency offset 360 may be less than or equal to 0.5 divided by the chip sequence repetition cycle and the fine step size 370 may be less than or equal to one-third divided by the chip sequence repetition cycle.

In other embodiments, the frequency corrector 130 may be adapted for determining one set of correction frequencies per frequency change rate of a frequency change rate grid, the frequency change rate grid having a minimum frequency change rate, the maximum frequency change rate and a frequency change rate step size. Similar considerations as were described above would result for the frequency change rates in such embodiments.

Figure 4:
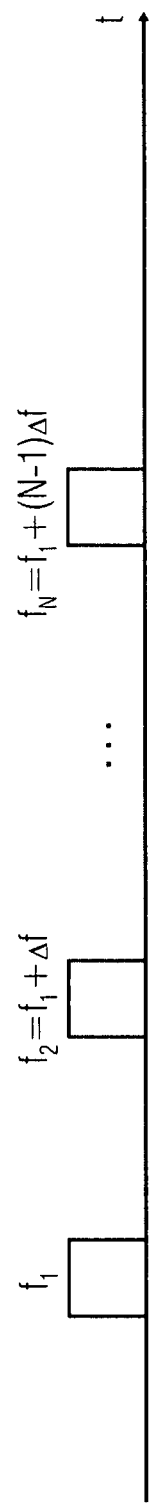
FIG. 4 illustrates consideration of frequency changes.

FIG. 4 illustrates the considerations of frequency change rates. FIG. 4 shows a time line, on which several receive signal segments are indicated by labels 1, 2, . . . , N. If transmitter and receiver move relatively to each other, then a frequency offset occurs. In FIG. 4 it is assumed that this frequency offset $f_1$ applies to segment 1. Now, if the relative velocity between the transceiver and the receiver changes in time, then said frequency offset changes as well. Assuming that the relative velocity between the transmitter and the receiver constantly increases, i.e., the acceleration between them is constant, for equidistant receive signal segments, the same frequency offsets yield. In FIG. 4, it is indicated that between receive signal segment 1 and 2, a frequency change of Δf occurs, and thus, $$f_2 = f_1 + \Delta f.$$

Accordingly, for receive signal segment N yields $$f_N = f_1 + (N-1)\Delta f.$$

In this embodiment it was assumed that an acceleration between transmitter and receiver is constant. Embodiments are not limited to this assumption, which serves for explanatory purposes only. Generally, any arbitrary accelerations, motions or velocities between a transmitter and a receiver may be taken into account, in order to derive a set of correction frequencies. The correction frequencies may then change independently between the segments along the time line.

In one embodiment, the minimum frequency change rate may be greater than or equal to −2 Hz/sec, the maximum frequency change rate may be less than or equal to 2 Hz/sec and the change rate step size for the frequency change rate grid between the minimum and maximum frequency change rates may be less than or equal to 0.5 Hz/sec.

Thus, in embodiments the number of sets of correction frequencies may be determined the number of coarse correction frequencies in the coarse grid multiplied by the number of fine correction frequencies in the fine grid multiplied by the number of different frequency change rates in the frequency change rate grid.

In embodiments, the correlator 150 may be adapted for correlating the predetermined chip sequence with each frequency corrected receive signal segment of a set to obtain a segment correlation value or function for each frequency corrected signal segment of the set of correction frequencies. The correlator 150 can then be further adapted for combining all segment correlation values or functions of the set to obtain one set correlation value per set of correction frequencies. The number of different sets of correction frequencies can be determined by the number of coarse correction frequencies multiplied by the number of fine correction frequencies multiplied by the number of different frequency changes that can be taken into account.

In embodiments the frequency corrector 130 may be adapted for providing phase shifts per correction frequency of the fine grid of correction frequencies to frequency correct correlation values of frequency corrected receive signal segments based on the coarse grid of frequencies. Referring back to FIG. 3, instead of determining correlations for each set of correction frequencies for each correction frequency of the fine grid, the fine grid correlations may be replaced by coarse grid correlations multiplied by phase shifts. The frequency corrector 130 may then be adapted for providing phase shifts also per frequency change rate of the frequency change rate grid to frequency corrected receive signal segment correlations based on the coarse grid of frequencies. In other words, in embodiments the correlations for the fine grid frequencies and the frequency rate changes may be replaced or approximated by applying phase shifts to correlations of frequency corrected receive signal segments having been corrected according to correction frequencies of the coarse grid.

The application of the phase shifts, e.g. the multiplication of the correlation values or functions resulting from the coarse grid, may be carried out in the correlator 150. In other embodiments it may be carried out by a separate approximator, which receives sets of segment correlation values from the correlator 150 and applies sets of phase shifts to the sets of segment correlation values. A set correlation value or function can then be determined by the approximator, or the correlator 150 respectively, by combining the phase shifted segment correlation values of a set. In other words, the frequency corrector 130 may provide sets of phase shifts instead of the correction frequencies of the fine grid and the frequency change grid. Based on combining the phase shifted segment correlation values or functions of a set of frequency corrected receive signal segments according to the coarse frequency correction grid, the set correlation values of the fine and the frequency change rate frequency correction grids can be determined. In embodiments these operations may be carried out by the correlator 150, the frequency corrector 130 or an approximator.

The received signal 115 may be a Code-Spread-Spectrum receive signal or a CDMA receive signal (CDMA=Code Division Multiple Access). In other embodiments, it may be a receive signal according to a GNSS, GPS (GPS=Global Positioning System), the Galileo system, GLONASS (GLONASS=Russian GNSS, etc.). However, embodiments are not limited to these systems, their scope may refer to any frequency distorted or shifted receive signal.

Figure 5:
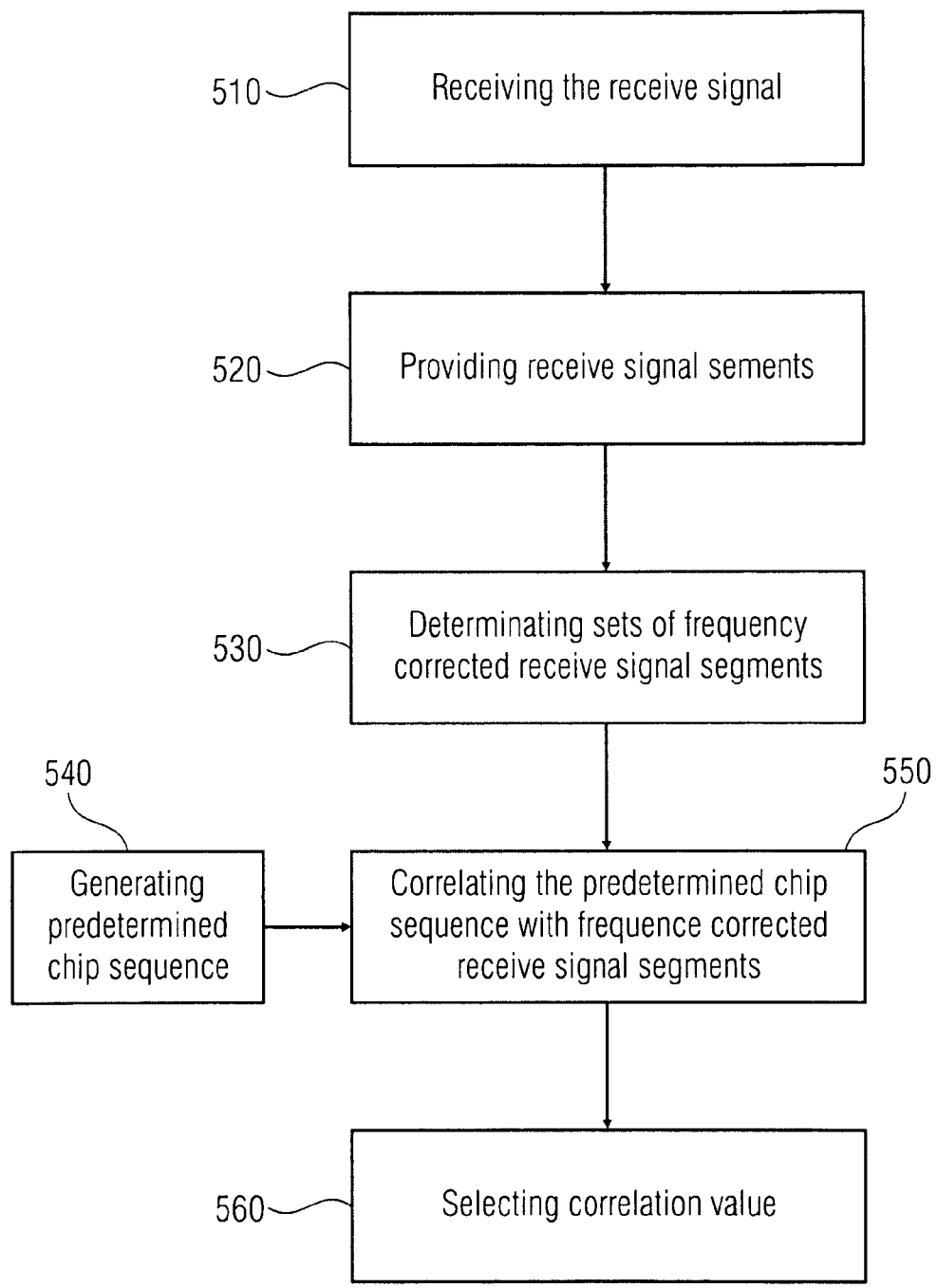
FIG. 5 shows a flowchart of an embodiment of a method for determining a correlation value.

FIG. 5 illustrates a flow chart of an embodiment of a method for determining a correlation value of a predetermined repetitive chip sequence and a receive signal, the chip sequence having a chip sequence duration and a chip sequence repetition cycle. The first step 510 is receiving the receive signal. Step 510 is followed by the step 520 of providing receive signal segments from the receive signal, two receive signal segments representing the same chip sequence in different repetition cycles and having at least one repetition cycle time spacing. A step 530 follows, wherein the sets of frequency corrected signal segments based on sets of correction frequencies are determined, the correction frequencies being based on the chip sequence duration and the chip sequence repetition cycle. In a step 540, the predetermined chip sequence is generated. In the following step 550, correlating the predetermined chip sequence with the frequency corrected receive signal segments of the set to obtain a set correlation value is carried out. In a last step 560, one of the set correlation values meeting a predetermined condition is selected as the correlation value.

In embodiments the predetermined condition, which is met by the selected correlation value could be the highest correlation value from a correlation function. In other embodiments in order to determine a correlation value with a certain certainty, the correlation value may have to exceed a predetermined threshold. This could, for example, be in order to determine a correct correlation value in a corresponding time with a given certainty, i.e. for example a bit error ratio, e.g. 2%. Related to the bit error ratio there could be a certain SNR threshold and as soon as a correlation value above the threshold is determined, the procedure is ended. Naturally, a number of different criteria in order to select the correlation value are conceivable, the inventive method shall not be limited to any particular one of them.

In general, the aim of carrying out or evaluating the Doppler grid, i.e. the coarse, fine and change rates, is to wipe out the Doppler Effect during the coherently integrated signal piece. The remaining Doppler frequency, which can be called $f_D^{error}$, is the wave that is still modulating the signal. In order to enable coherent superposition, when a continuous signal piece is used, this frequency should be small enough so to approximately have the same phase in all coherently added correlation peaks. As explained above, this is what leads to the condition of the Doppler bin size of $$\Delta f_{bin} = \frac{2}{3 \cdot T_{COH}} \qquad (2)$$

Since embodiments of the present invention segment the coherent integration time, this condition can be avoided and therefore a higher frequency bin size realized. This advantage results from embodiments not integrating a continuous $T_{COH}$ signal piece, but several signal pieces, corresponding to sub-pieces, similar to a time hopping manner. In other words, embodiments may utilize a signal of $T_{COH}$ length, formed by equally time spaced repetitive sub-pieces. The length of the time pieces can be a multiple of the PRN code duration, i.e. a chip sequence duration.

If the receive signal provides a pilot data sequence, i.e. a known sequence, the time space $T_{SPACE}$ between the sub-pieces can be a multiple of the duration of this sequence, $T_{PILOT}$ in order to ensure that the data symbols on the sub-pieces are the same. This is illustrated in FIG. 2, where the repetition cycle of the sequence is $T_{SPACE}$ and the chip sequence duration is $T_{sub-piece}$. Embodiments therefore achieve two advantages, first a coherent integration sum can be carried out due to the equality of symbols of the sub-pieces and second, no pilot sequence synchronization is needed, since $T_{SPACE}=K \cdot T_{PILOT}$, wherein K is a natural number greater than or equal to 1. Thus, receive signal segments may be taken into account, which have a spacing that is an integer multiplier of the repetition cycle.

In order to perform a coherent sum between sub-pieces correlation peaks, the phase of the remaining Doppler frequency $f_D^{error}$ on those pieces should be almost "equal". Two conditions can be formulated, if the sub-pieces or segments are separated as described above, the Doppler bin definition changes through the following conditions:

$$\Delta f_{bin}^{coarse} = \frac{2}{3 \cdot T_{sub-piece}} \Leftrightarrow |f_D^{error}| < \frac{\Delta f_{bin}^{coarse}}{2} \qquad (3)$$

$$|f_D^{error}| = \frac{K}{T_{SPACE}}, \qquad (4)$$

where K is a whole number.

With the first condition, it can be ensured that a correlation peak is correctly generated within the coarse Doppler bin, which is nearest to the real Doppler frequency $f_D$, in every sub-piece or segment, although it may not be possible to distinguish it due to the low SNR. In other words the first condition refers to coherent superposition of the signals within one receive signal segment, yielding the coarse correction frequency grid.

With the second condition, it can be ensured that the phases of the not distinguishable correlation peaks of each sub-piece or segment are equal, and therefore, they can be coherently added. In other words, the second condition refers to coherent superposition of the resulting correlation values, sequences or functions of different receive signal segments, yielding the fine frequency correction grid. To reach this target, another Doppler grid has to be done on the surroundings of the previous correlated Doppler bin, i.e. a fine frequency correction grid is applied on top of the coarse frequency correction grid. This fine Doppler grid range can be defined by $T_{SPACE}$ in the following way:

$$\text{Fine\_Doppler\_Range} = f_D^{coarse\_bin} + \left[\frac{-1}{2 \cdot T_{SPACE}}, \frac{1}{2 \cdot T_{SPACE}}\right]. \quad (5)$$

As can easily be seen, the size of the range can be decreased when $T_{SPACE}$ is increased. Embodiments may use this fact as being guided to a computational burden reduction. Furthermore, if this fine Doppler range is small enough, no correlations have to be necessarily performed with respect to the fine frequency correction grid, as those correlations can be approximated by a phase change applied on the coarse frequency correction correlations.

Figure 6:
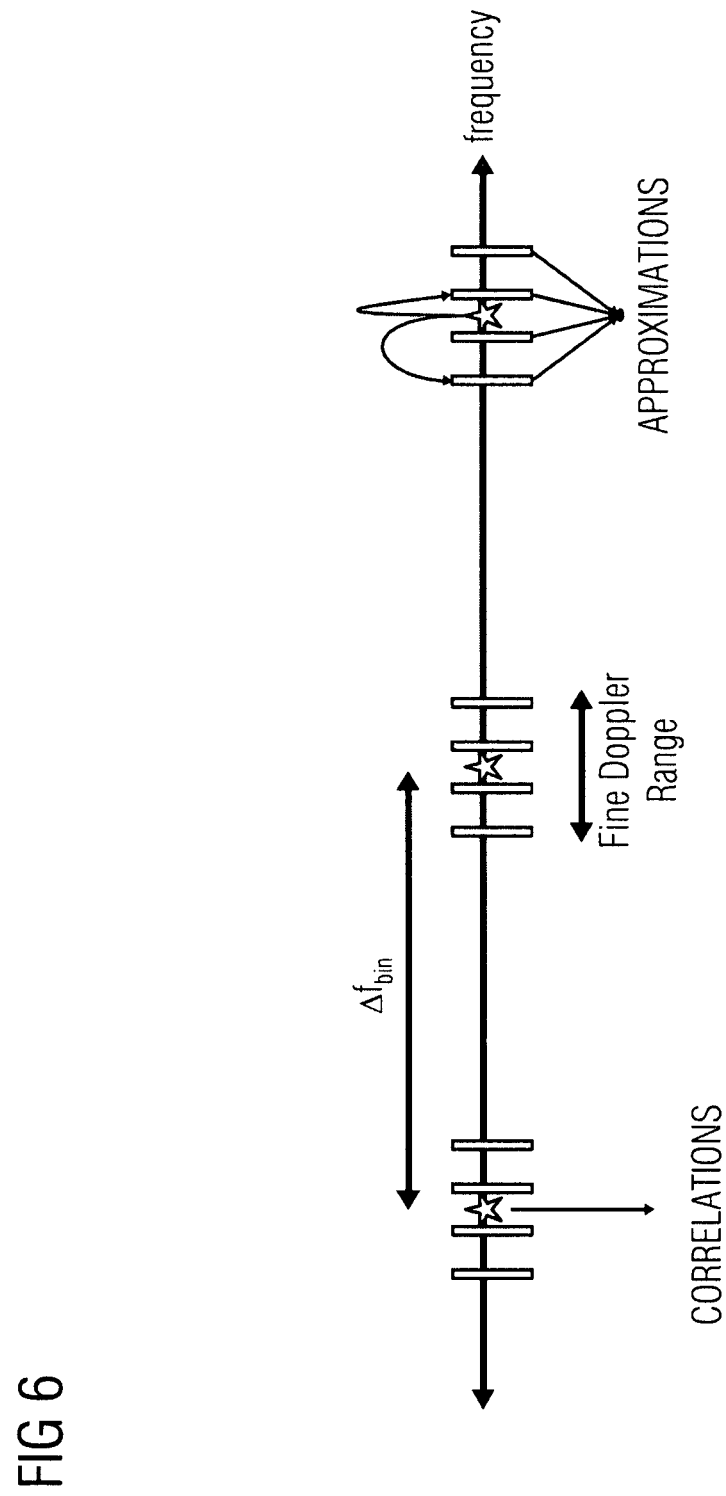
FIG. 6 illustrates the relation between correlations and phase shifts.

FIG. 6 illustrates this idea by showing a frequency axis with coarse frequencies indicated by stars grid with a coarse frequency step size of $\Delta f_{bin}^{coarse}$. Around each of the coarse correction frequencies, there are a number of fine correction frequencies which are indicated by bars of the fine Doppler range. Instead of evaluating correlations of each of the frequencies of the fine Doppler range, correlations may be performed only for the coarse correction frequencies (stars), the fine correction frequencies can be approximated by phase shifts, as is indicated on the right hand side of FIG. 6.

In embodiments, the approximation may be performed as follows:

$$\text{correlation}(f_D^{fine\_bin}) = \text{correlation}(f_D^{coarse\_bin}) \cdot \exp(\Delta\varphi) \quad (6)$$

where $\Delta\varphi = -j2\pi(f_D^{fine\_bin} - f_D^{coarse\_bin}) \cdot n \cdot T_{SPACE}$, n is the signal sub-piece index, $f_D^{fine\_bin}$ is the bin inside of the fine Doppler range and $f_D^{coarse\_bin}$ is the coarse Doppler bin within the current fine Doppler range.

As mentioned above, the higher $T_{SPACE}$ is chosen the longer it takes for constructing a complete set of sub-pieces or segments of size $T_{COH}$. In some scenarios this could be critical, if the Doppler frequency changes during this time. Embodiments may therefore also take the frequency change rate into account, which can be denoted by:

$$\frac{\partial f_D}{\partial t}. \quad (7)$$

This parameter, for a normal static GNSS receiver may for example necessitate a value within the range of [−1, 1] Hz/sec. This value may represent the changes in velocity between the receiver and the transmitter, i.e. an acceleration value. The longer the considered time period, the higher the impact of the change rate of the frequency. The change in frequency relates directly to the remaining Doppler frequency, as $$\left(\frac{\partial f_D^{error}}{\partial t} = \frac{\partial f_D}{\partial t}\right), \quad (8)$$

i.e. $f_D^{error}$ may not be a constant value, but a linearly varying value:

$$f_D^{error} = f_D^{error}\Big|_0 + \frac{\partial f_D}{\partial t} \cdot t. \quad (9)$$

In this embodiment $f_D^{error}$ may be approximated as a linearly varying value, according to the above Tailor sequence. Generally, in embodiments a more complex variation of the frequency error can be taken into account.

In order to combat the transmitter-receiver acceleration effect, another grid, the frequency change grid, can be taken into account along the range of $$\frac{\partial f_D}{\partial t}. \quad (10)$$

In embodiments this grid may represent a third dimension search and involves an increment of computational burden. In other embodiments, it may also be carried out within the same approximation as already mentioned above. Actually, a small change can be introduced on the phase approximation expression in order to take this third grid into account:

$$\Delta\varphi = -j2\pi(f_D^{fine\_bin} - f_D^{coarse\_bin}) \cdot n \cdot T_{SPACE} - j\frac{\partial f_D^{bin}}{\partial t}\pi \cdot (n \cdot T_{SPACE})^2 \quad (11)$$

The computational complexity of this method again depends on the grid step size, which is now determined by the last two dimensions, i.e. the fine Doppler frequency grid, $f_D^{fine\_bin}$ and the Doppler frequency change rate or grid $$\left(\frac{\partial f_D^{bin}}{\partial t}\right). \quad (12)$$

In embodiments, once the sub-pieces size, i.e. the chip sequence duration and $T_{SPACE}$ are fixed, these steps only depend on $T_{COH}$, i.e. on the number of sub-pieces that are desired to integrate coherently. The higher this number, the finer the grids can be done.

Figure 7:
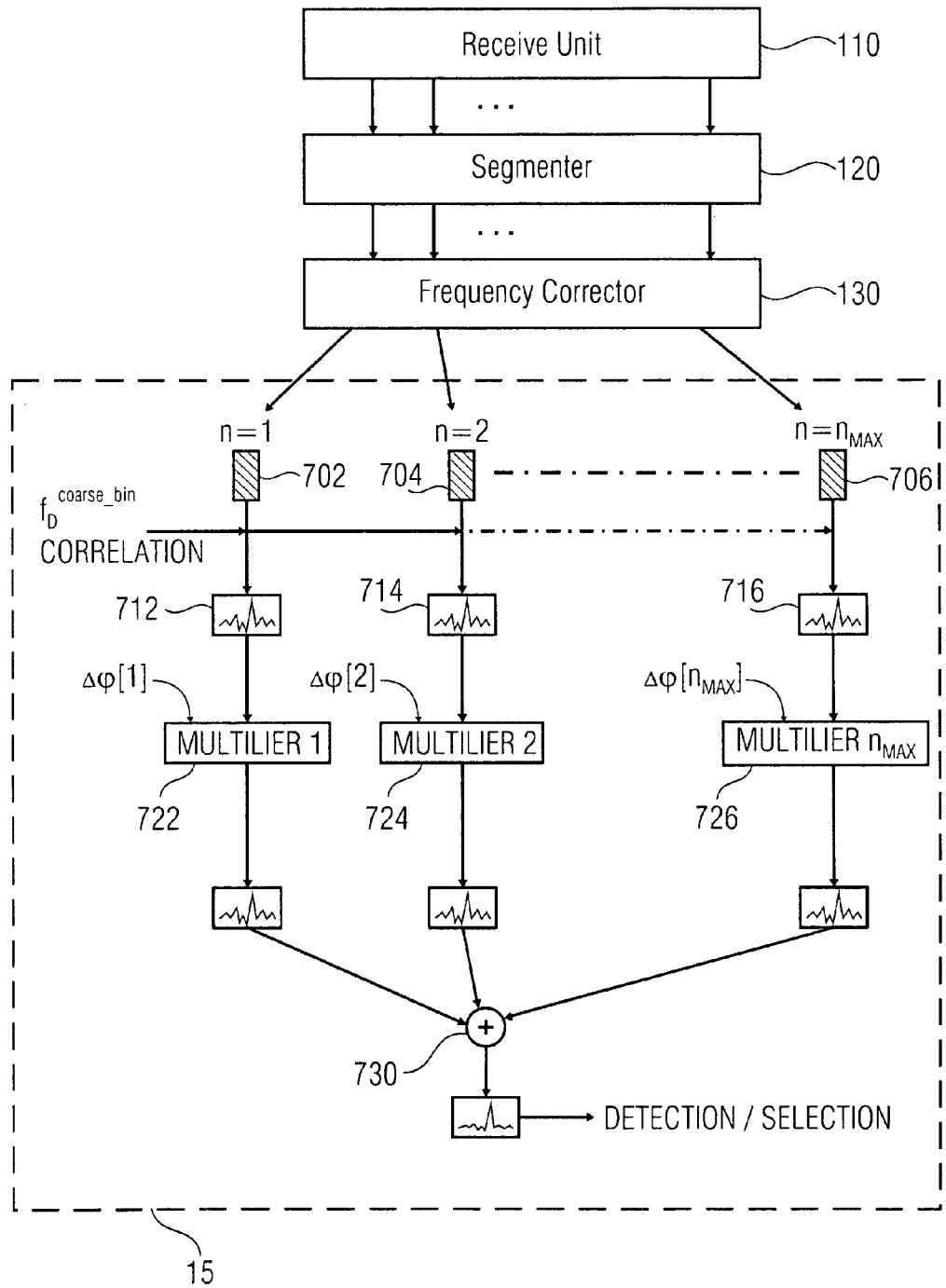
FIG. 7 illustrates an embodiment of a parallel receiver structure.

In other embodiments, a reduction of the whole operation can be achieved if more than one complex multiplier are implemented in hardware in order to carry out more multiplications simultaneously. As shown above in the $\Delta\varphi$ definition, an approximation may be applied to every sub-piece or segment, wherein the approximation value may depend on the sub-piece index n, $\Delta\varphi[n]$. A parallelization may reduce the computational time by the number of multipliers implemented in parallel. FIG. 7 illustrates an embodiment of a receiver structure having such a parallelization. FIG. 7 shows $n_{MAX}$ frequency corrected receive signal segments 702, 704 and 706, as e.g. provided by a receive unit 110, a segmenter 120 and a frequency corrector 130. It is supposed in FIG. 7 that all of these receive signal segments have already been corrected coarse according to a coarse correction frequency $f_D^{coarse\_bin}$, i.e. in this embodiment the steps described in the following may be carried out for each correction frequency of the coarse correction frequency grid, i.e. for each of the frequency corrected sets of receive signal segments for each correction frequency of the coarse frequency grid.

Each of the receive signal segments 702, 704 and 706 is then correlated in a correlator 150 with the locally generated predetermined chip sequence, yielding the segment correlation values or functions 712, 714 and 716. Instead of correlating also with the fine correction frequencies, the outputs of the segment correlation values or functions 712, 714, and 716 are multiplied with phase shifts, within the multipliers 722, 724 and 726. The phase shifts $\Delta\varphi[1]$, $\Delta\varphi[2]$, ..., $\Delta\varphi[n_{MAX}]$ correspond to the above definition, i.e. there may be as many phase shifts as the product of number of different frequency change rates and number of different frequency bins within the fine frequency correction grid. FIG. 7 shows an embodiment wherein the application of the phase shifts is done in the correlator 150. Other embodiments may carry these operations out in a separate approximator. Corresponding phase shifts may be provided by the frequency corrector, respectively by another separate entity, e.g. the approximator.

The phase shifted segment correlation values are then added in the adder 730, upon which a correlation value respectively a correlation function yields, which can be provided to a detector, respectively, selector in order to find the correlation value, e.g. a correlation peak. From the result displayed in FIG. 7 at the output In order to better appreciate the improvements of the embodiments, a comparison of the computational complexity between the conventional way and an embodiment is considered in the following, based on the Galileo GNSS system. This system provides a pilot channel and a pilot data sequence of 25 BPSK (BPSK=Binary Phase Shift Keying) symbols. The unit for weighting the computational complexity will be the number of complex multiplications to be performed by each method. First, the main parameters of the Galileo system that affect the acquisition algorithms are shown. Some of them also depend on the receiver's parameters and they have been fixed nowadays to the most commonly chosen values, however embodiments are not restricted to them.

The coherently integrated time desired $T_{COH}$=100 ms. The Galileo Parameters are PRN length of 4 ms, the number of points in 4 ms is $$N=2^{14} (16K \text{ FFTs})$$

and $$T_{PILOT}=100 \text{ ms},$$

made of a sequence of 25 BPSK symbols.

The classic algorithm uses a Radix-2 FFT module in hardware.

The parameters of the new algorithm are $$T_{SPACE} = 100 \text{ ms} \rightarrow \text{Fine\_Doppler\_Range} =$$
$$f_D^{coarse\_bin} + [5, 5] \text{ Hz},$$

$$T_{sub-piece} = \text{one } PRN \text{ code} = 4 \text{ ms},$$

$$\Delta f_D^{fine} = 0.08 \text{ Hz}$$

$$\Delta\left(\frac{\partial f_D}{\partial t}\right) = 0.3 \text{ Hz/sec}.$$

These grids have been calculated with a small script, based on the $\Delta\varphi$ expression given above and provide a minimum efficiency of 84.5% on the coherent integration, due to the phase mismatch of the signal sub-pieces. Therefore, in order to obtain a gain of 100 ms coherent integration, 116 ms will have to be integrated ($T_{COH}^{efficient}$), in order to ensure this gain. This way, the number of sub-pieces to be integrated raises to $N_{SUB-PIECE}$=29, and the number of multipliers ($N_{multipliers}$) implemented will also be 29.

The parameters for the classic algorithm are $$\Delta f_D^{bin} = \frac{2}{3 \cdot 100 \text{ ms}} \approx 6 \text{ Hz},$$

$$\text{Number\_Correlations} = \frac{T_{COH}}{\text{PRN\_length}} \cdot \frac{10 \text{ KHz}}{\Delta f_D^{bin}} = \frac{100 \text{ ms}}{4 \text{ ms}} \cdot \frac{10 \text{ KHz}}{6 \text{ Hz}} \approx 41667.$$

Each correlation is done with the 3 FFTs and the number of multiplications in one radix-2 FFT is given by $$\frac{N}{2} \cdot \log_2(N),$$

where N is the number of points of the FFT. In this case, $N=2^{14}$. Moreover, a disadvantage of this method is that it necessitates synchronization with the pilot symbol sequence, which in this case, is made of 25 symbols. Therefore, all these operations need to be multiplied by 25.

Hence $$\text{Computational\_Burden}(CB) =$$
$$25_{syn} \cdot 3_{FFT/corr} \cdot \text{Number\_Correlations} \cdot \frac{N}{2} \cdot \log_2(N)$$

$CB=358.4 \cdot 10^9$ complex multiplications.

For the new algorithm (3-dimension search), follows $$\Delta f_D^{coarse} = \frac{2}{3 \cdot T_{sub-piece}} \approx 166 \text{ Hz},$$

$$\text{Number\_Correlations} = \frac{T_{COH}^{efficient}}{\text{PRN\_length}} \cdot \left\lceil \frac{10 \text{ KHz}}{\Delta f_D^{coarse}} \right\rceil = \frac{116 \text{ ms}}{4 \text{ ms}} \cdot \frac{10 \text{ KHz}}{166 \text{ Hz}} \approx 1747,$$

Number_Approximation per_Coarse_Doppler_Bin =

$$N_{app} = = \frac{\text{Fine\_Doppler\_Range}}{\Delta f_D^{fine}} \cdot \frac{\text{Doppler\_Change\_Rate\_Range}}{\Delta\left(\frac{\partial f_D}{\partial t}\right)},$$

$$N_{app} = \left\lceil \frac{5 \text{ Hz} - (-5 \text{ Hz})}{0.08 \text{ Hz}} \right\rceil \cdot \left\lceil \frac{1 \text{ Hz/sec} - (1 \text{ Hz/sec})}{0.3 \text{ Hz/sec}} \right\rceil = 875,$$

$$CB = 3_{FFT/corr} \cdot \text{Number\_Correlation} \cdot \frac{N}{2} \log_2(N) +$$
$$\left\lceil \frac{10 \text{ KHz}}{\Delta f_D^{coarse}} \right\rceil \cdot \frac{N_{sub\_piece} \cdot N_{app} \cdot N}{N_{multipliers}},$$

$CB \approx 1.46 \cdot 10^9$ complex multiplications

The gain on the computational burden with the new algorithm is easily appreciated, because it has been reduced by a factor of 245.

Embodiments of the present invention provide the advantage that they increase a SNR in order to acquire satellites on GNSS. Embodiments may be used in all CDMA or other communication systems, in which an unknown Doppler effect takes place. This may be the case for example in CDMA based GNSS, like GPS, Galileo, Compass, etc. Embodiments may also be used on spread spectrum communication systems like for example Glonass (Russian GNSS), which even if it is not a CDMA system, it does use PRN-code for spreading its signal spectrum.

Embodiments of the present invention enable the breaking of the law of Doppler frequency bins, in terms of the number of correlations to be performed. The coherently integrated signal times may be extended out of the bit boundaries, even with a lower computational complexity than before. Embodiments provide another significant advantage, in that they may not rely on a synchronization with a pilot sequence, as the repetition period or cycle of pilot sequences is known in such systems. Embodiments may therefore enable the acquisition in indoor scenarios of GNSS stand-alone receivers, which can be easily equipped with an embodiment and yielding an acceptable time consumption.

Depending on certain implementation requirements of the inventive methods, the inventive methods can be implemented in hardware or in software. The implementation can be performed using a digital storage medium, in particular a disc, DVD, CD, etc., having electronically readable control signals stored thereon, which cooperate with a programmable computer system such that the inventive methods are performed. Generally, the present invention is therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Receiver apparatus for determining a correlation value of a predetermined repetitive chip sequence in a receive signal, the chip sequence comprising a chip sequence duration and a chip sequence repetition cycle, comprising
   a receive unit for receiving the receive signal;
   a segmenter for providing receive signal segments from the receive signal, two receive signal segments representing the same chip sequence in different repetition cycles and comprising at least one repetition cycle time spacing;
   a frequency corrector for determining sets of frequency corrected receive signal segments based on sets of correction frequencies, the correction frequencies being based on the chip sequence duration and the chip sequence repetition cycle;
   a chip sequence generator for generating the predetermined chip sequence;
   a correlator for correlating the predetermined chip sequence with the frequency corrected receive signal segments of a set to acquire a set correlation value; and
   a selector for selecting one of the set correlation values meeting a predetermined condition as the correlation value, wherein the frequency corrector is adapted for determining one set of correction frequencies per frequency of a coarse grid of frequencies between a minimum coarse frequency and a maximum coarse frequency with a coarse step size being based on the chip sequence duration;
   the frequency corrector is adapted for determining one set of correction frequencies per frequency of a fine grid of frequencies around a correction frequency of the coarse grid, the fine grid comprising a minimum fine frequency offset from the coarse correction frequency, a maximum fine frequency offset from the coarse correction frequency and a fine step size; and
   the minimum fine frequency is greater than or equal to −0.5 divided by the chip sequence repetition cycle, the maximum fine frequency offset is less than or equal to 0.5 divided by the chip sequence repetition cycle and the fine step size is less than or equal to one-third divided by the chip sequence repetition cycle.

2. Receiver apparatus of claim 1, wherein the frequency corrector is adapted for determining the correction frequencies based on receive signal frequency changes.

3. Receiver apparatus of claim 1, wherein each frequency correction set comprises a correction frequency for each receive signal segment.

4. Receiver apparatus of claim 1, wherein the minimum coarse frequency is greater than or equal to −5 kHz, the maximum coarse frequency is less than or equal to 5 kHz and the coarse step size is less than or equal to two-thirds divided by the chip sequence duration.

5. Receiver apparatus of claim 1, wherein the correlator is adapted for correlating the predetermined chip sequence with each frequency corrected receive signal segment of a set to acquire a segment correlation value for each frequency corrected receive signal segment for a set of correction frequencies and for combining all segment correlation values of each set of correction frequencies to acquire one correlation value per set of correction frequencies.

6. Receiver apparatus of claim 1, wherein the frequency corrector is adapted for providing a phase shift per correction frequency of the fine grid for the frequency corrected receive signal segments based on the coarse grid of frequencies.

7. Receiver apparatus of claim 6, wherein the correlator is adapted for applying the phase shift to the segment correlation values and for combining the phase shifted segment correlation values to acquire one correlation value per set of correction frequencies.

8. Receiver apparatus of claim 1, wherein the receive unit is adapted for receiving a CDMA-(CDMA=Code Division Multiple Access), a GNSS (GNSS=Global Navigation Satellite System), a GPS (GPS=Global Positioning System), a Galileo, a Glonass-signal.

9. Receiver apparatus for determining a correlation value of a predetermined repetitive chip sequence in a receive signal, the chip sequence comprising a chip sequence duration and a chip sequence repetition cycle, comprising
   a receive unit for receiving the receive signal;
   a segmenter for providing receive signal segments from the receive signal, two receive signal segments representing the same chip sequence in different repetition cycles and comprising at least one repetition cycle time spacing;
   a frequency corrector for determining sets of frequency corrected receive signal segments based on sets of correction frequencies, the correction frequencies being based on the chip sequence duration and the chip sequence repetition cycle;
   a chip sequence generator for generating the predetermined chip sequence;

a correlator for correlating the predetermined chip sequence with the frequency corrected receive signal segments of a set to acquire a set correlation value; and a selector for selecting one of the set correlation values meeting a predetermined condition as the correlation value, wherein the frequency corrector is adapted for determining one set of correction frequencies per frequency change rate of a frequency change rate grid, the frequency change rate grid comprising a minimum frequency change rate, a maximum frequency change rate and a frequency change rate step size.

10. Receiver apparatus of claim 9, wherein the minimum frequency change rate is greater than or equal to −2 Hz/s, the maximum frequency change rate is less than or equal to 2 Hz/s and the change rate step size is less than or equal to 0.5 Hz/s.

11. Receiver apparatus of claim 9, wherein the frequency corrector is adapted for providing a phase shift per frequency change rate of the frequency change rate grid for the frequency corrected received signal segments based on the coarse grid of frequencies.

12. Receiver apparatus of claim 9, wherein the frequency corrector is adapted for determining the correction frequencies based on receive signal frequency changes.

13. Receiver apparatus of claim 9, wherein each frequency correction set comprises a correction frequency for each receive signal segment.

14. Receiver apparatus of claim 9, wherein the frequency corrector is adapted for determining one set of correction frequencies per frequency of a coarse grid of frequencies between a minimum coarse frequency and a maximum coarse frequency with a coarse step size being based on the chip sequence duration.

15. Receiver apparatus of claim 14, wherein the minimum coarse frequency is greater than or equal to −5 kHz, the maximum coarse frequency is less than or equal to 5 kHz and the coarse step size is less than or equal to two-thirds divided by the chip sequence duration.

16. Receiver apparatus of claim 14, wherein the frequency corrector is adapted for determining one set of correction frequencies per frequency of a fine grid of frequencies around a correction frequency of the coarse grid, the fine grid comprising a minimum fine frequency offset from the coarse correction frequency, a maximum fine frequency offset from the coarse correction frequency and a fine step size.

17. Receiver apparatus of claim 16, wherein the frequency corrector is adapted for providing a phase shift per correction frequency of the fine grid for the frequency corrected receive signal segments based on the coarse grid of frequencies.

18. Receiver apparatus of claim 17, wherein the correlator is adapted for applying the phase shift to the segment correlation values and for combining the phase shifted segment correlation values to acquire one correlation value per set of correction frequencies.

19. Receiver apparatus of claim 9, wherein the correlator is adapted for correlating the predetermined chip sequence with each frequency corrected receive signal segment of a set to acquire a segment correlation value for each frequency corrected receive signal segment for a set of correction frequencies and for combining all segment correlation values of each set of correction frequencies to acquire one correlation value per set of correction frequencies.

20. Receiver apparatus of claim 9, wherein the receive unit is adapted for receiving a CDMA-(CDMA=Code Division Multiple Access), a GNSS (GNSS=Global Navigation Satellite System), a GPS (GPS=Global Positioning System), a Galileo, a Glonass-signal.

* * * * *

UNITED STATES PATENT AND TRADEMARK OFFICE
CERTIFICATE OF CORRECTION

PATENT NO. : 8,503,511 B2 Page 1 of 1
APPLICATION NO. : 12/441976
DATED : August 6, 2013
INVENTOR(S) : Ion Suberviola It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Fifteenth Day of September, 2015

Michelle K. Lee
*Director of the United States Patent and Trademark Office*